United States Patent
Karlsson et al.

(10) Patent No.: US 10,757,633 B2
(45) Date of Patent: Aug. 25, 2020

(54) OPTIMIZED BROADCASTING OF SYSTEM INFORMATION MESSAGES

(71) Applicant: Telefonaktiebolaget LM Ericsson (publ), Stockholm (SE)

(72) Inventors: Patrik Karlsson, Sollentuna (SE); Ulf Eric Andretzky, Huddinge (SE); Rasmus Axén, Linköping (SE); Tomas Nylander, Värmdö (SE); Per-Daniel Stålnacke, Bromma (SE); Thomas Walldeen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/769,680

(22) PCT Filed: Oct. 21, 2015

(86) PCT No.: PCT/SE2015/051119
§ 371 (c)(1),
(2) Date: Apr. 19, 2018

(87) PCT Pub. No.: WO2017/069669
PCT Pub. Date: Apr. 27, 2017

(65) Prior Publication Data
US 2018/0255503 A1    Sep. 6, 2018

(51) Int. Cl.
*H04W 48/10* (2009.01)
*H04W 72/00* (2009.01)
(Continued)

(52) U.S. Cl.
CPC ........ *H04W 48/10* (2013.01); *H04W 48/12* (2013.01); *H04W 52/0206* (2013.01);
(Continued)

(58) Field of Classification Search
None
See application file for complete search history.

(56) References Cited

U.S. PATENT DOCUMENTS

| 2011/0105158 A1 | 5/2011 | Arora et al. |
| 2015/0092768 A1* | 4/2015 | Ng .................... H04W 48/16 370/350 |

(Continued)

FOREIGN PATENT DOCUMENTS

| EP | 2525608 A1 | 11/2012 |
| EP | 2658155 A2 | 10/2013 |

(Continued)

OTHER PUBLICATIONS

Unknown, Author , "5G—Key Component of the Networked Society", RWS-150009, 3GPP RAN Workshop on 5G, Phoenix, Arizona, USA, Sep. 17-18, 2015, pp. 1-55.

*Primary Examiner* — Ruihua Zhang
(74) *Attorney, Agent, or Firm* — Sage Patent Group

(57) ABSTRACT

The present disclosure relates to a network node, a network control node, a wireless device and corresponding methods for optimized broadcasting of system information messages in a wireless network. The disclosure proposes a method, performed in a wireless device, of assessing system information perception capability in a wireless network that is arranged to broadcast system information on at least two frequency carriers. The method comprises receiving (S10) broadcasted system information on the at least two frequency carriers. The method also comprises determining (S12), using the received broadcasted system information, frequency carrier identity correlated information for each of the at least two frequency carriers. The method further comprises reporting (S14) receipt of the broadcasted system information on the at least two frequency carriers, wherein (Continued)

the report includes the frequency carrier identity correlated information.

15 Claims, 7 Drawing Sheets

(51) Int. Cl.
    *H04W 74/00*     (2009.01)
    *H04W 52/02*     (2009.01)
    *H04W 48/12*     (2009.01)
    *H04W 8/24*     (2009.01)
    *H04W 24/02*     (2009.01)
    *H04W 72/08*     (2009.01)

(52) U.S. Cl.
    CPC ....... *H04W 72/005* (2013.01); *H04W 74/008* (2013.01); *H04W 8/24* (2013.01); *H04W 24/02* (2013.01); *H04W 72/082* (2013.01); *Y02D 70/1242* (2018.01); *Y02D 70/1262* (2018.01); *Y02D 70/146* (2018.01); *Y02D 70/164* (2018.01)

(56) References Cited

U.S. PATENT DOCUMENTS

| | | | |
|---|---|---|---|
| 2015/0146623 A1* | 5/2015 | Bi | H04B 7/024 |
| | | | 370/328 |
| 2016/0262030 A1* | 9/2016 | Dhanapal | H04J 13/0003 |
| 2016/0302118 A1* | 10/2016 | Yiu | H04W 72/082 |
| 2018/0359653 A1* | 12/2018 | Svedman | H04W 56/0015 |

FOREIGN PATENT DOCUMENTS

| | | |
|---|---|---|
| WO | 2011139855 A1 | 11/2011 |
| WO | 2011139857 A1 | 11/2011 |
| WO | 2013077783 A1 | 5/2013 |
| WO | 2014036692 A1 | 3/2014 |

* cited by examiner

OPTIMIZED BROADCASTING OF SYSTEM INFORMATION MESSAGES

TECHNICAL FIELD

The present disclosure relates to a network node, a network control node, a wireless device and methods for optimized broadcasting of system information messages in a wireless network.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD and Time Division Duplex, TDD, modes.

In 5G, i.e. 5th generation mobile networks, there will be evolvement of the current LTE system to 5G. One of the main tasks for 5G is to improve throughput and capacity compared to LTE. This is achieved by increasing the sample rate and bandwidth per carrier. 5G is also focusing on use of higher carrier frequencies i.e. above 5-10 GHz.

When a UE is switched on for the first time it will start searching for a network. The UE synchronizes to each frequency and checks whether this is a frequency from an operator to which it wants to connect. Once synchronized, the UE reads the Master Information Block, MIB, and System Information Blocks, SIBs, to check whether this is the right Public Land Mobile Network, PLMN. Following the reading, the next step is a random access procedure which allows the network to know that a UE is trying to get access. At this stage, the UE does not have any resource or channel available to inform the network about its desire to connect to, so a request will be sent over a shared medium.

The MIB only includes a very limited part of the system information. The main part is included in different SIB:s that are transmitted using the Downlink Shared Channel, DL-SCH. The presence of system information on DL-SCH in a subframe is indicated by the transmission of a corresponding Physical Downlink Control Channel, PDCCH, marked with a special System-Information Radio Network Temporary Identifier, RNTI. This PDCCH indicates the transport format and physical resource (set of resource blocks) used for the system-information transmission. There are a number of different system information blocks that are broadcasted repeatedly.

Future telecommunication systems will benefit from a lean design where the transmission of broadcast signals like MIB, SIB, or similar, and synchronization and common reference signals are only transmitted when necessary, i.e. when they are actually needed for measurements by one or several devices. The main reason for this is to reduce unnecessary interference as well as reduce the radio network node power consumption. A concept called System Control Plane, SCP, is introduced where a macro site broadcast the necessary system information on a frequency carrier. Other macro frequency carriers or high layer small sites within the macro site coverage do not need to broadcast all system information. These sites only need to broadcast a small System Signature Indication, SSI, pilot. If a UE make access to a site/carrier which only broadcast SSI, the UE use the broadcasted system information received from the macro site, by mapping the SSI to the right system information.

Even if the system and UE support the possibility to minimize the broadcast load, a pre-requisite to utilize the concept is that the system can be configured correctly, i.e. to configure transmission points and frequency carriers so that redundancy or sufficient coverage from other transmission points and frequency carriers is provided to enable that system information broadcast can be turned off of from a first set of transmission points and frequency carriers.

A good deployment plan of the system information broadcast plan is very complex without availability of good feedback information, which is currently not specified. Thus, there is a need in the art for improved feedback to enable a more resource efficient system design for broadcasting system information; a system design using an optimal set of transmission points and frequency carriers for system information broadcast.

SUMMARY

An object of the present disclosure is to provide methods which seeks to mitigate, alleviate, or eliminate one or more of the above-identified deficiencies in the art and disadvantages singly or in any combination and to provide methods for optimized broadcasting of system information messages in a wireless network. The present disclosure also relates to corresponding network nodes, network control nodes and wireless devices.

This object is obtained by a method, performed in a wireless device, of assessing system information perception capability in a wireless network that is arranged to broadcast system information on at least two frequency carriers. The method comprises receiving broadcasted system information on the at least two frequency carriers. The method also comprises determining, using the received broadcasted system information, frequency carrier identity correlated information for each of the at least two frequency carriers. The method further comprises reporting receipt of the broadcasted system information on the at least two frequency carriers, wherein the report includes the frequency carrier identity correlated information.

The disclosed method enables the wireless network to operate in a more energy efficient manner over the prior art by selectively enabling or disabling broadcasting of system information from specific transmission points and/or frequency carriers, which are anyway covered by other transmission points or frequency carriers, based on wireless device measurement feedback.

According to an optional aspect, the frequency carrier identity correlated information is determined from an area unique broadcast identity included in the received broadcasted system information.

An area unique broadcast identity in the system information broadcast simplifies a correlation to the transmission point and frequency carrier used.

According to an optional aspect, the frequency carrier identity correlated information is determined based on wireless device measurements.

The UE is then able to, in the random access, include the identity, e.g. the area unique broadcast identity, of, at least, the two strongest received transmission points and frequency carriers. The system can then easily identify which transmission points and frequency carriers the UEs hear simultaneously.

According to an optional aspect, the system information is a System Signature Indication, SSI.

With the SSI values, the system is then able to correlate this to the transmission point and frequency carriers broadcasting system information in the area where UE makes access. Building up statistical knowledge from multiple UE reporting can then enable the system to identify from which transmission points and frequency carriers there is multiple (excessive/overlapping) system information broadcast. If so is the case, the system can safely turn off system information broadcast from one transmission point and frequency carrier.

According to an optional aspect, the system information is an Access Information Table, AIT, comprising the System Signature Indication, SSI.

This enables the system to detect if there is a lack of system information broadcast to enable to turn on the corresponding transmission from a transmission point and frequency carrier.

The header information of the AIT comprises global time, which can be used to indicate that a UE is not able to receive any system broadcast information where it can make access to the system. The time stamp of the AIT enables determining how old the latest broadcast information reading is. If this is significantly older than a preferred time reading interval, it is an indication that the UE is not able to receive any system broadcast information where it can make access to the system.

CSG, Q-RxLevelMin, Frequencybandindicator, Barring info and Prach-configCommon are some of the SIB1/SIB2 information elements defined in LTE. Various combinations of such information enables determining frequency carrier identity correlated information for each of the at least two frequency carriers.

Another aspect relates to a wireless device, configured for assessing system information perception capability in a wireless network that is arranged to broadcast system information on at least two frequency carriers. The UE comprises a radio communication interface configured to communicate with a network node. The UE further comprises processing circuitry configured to cause the UE to receive broadcasted system information on the at least two frequency carriers. The processing circuitry is further configured to cause the UE to determine, using the received broadcasted system information, frequency carrier identity correlated information for each of the at least two frequency carriers. The processing circuitry is also configured to cause the UE to report receipt of the broadcasted system information on the at least two frequency carriers, wherein the report includes the frequency carrier identity correlated information.

The disclosed wireless device has all the advantages described above in relation to the disclosed method of assessing system information perception capability in a wireless network that is arranged to broadcast system information on at least two frequency carriers.

Another aspect relates to a computer program comprising computer program code which, when executed, causes a wireless device to execute the above disclosed method performed in a wireless device, with all the advantages described above in relation to the disclosed method of assessing system information perception capability in a wireless network that is arranged to broadcast system information on at least two frequency carriers.

Another aspect relates to a method performed in a network node of broadcasting system information in a wireless network. The method comprises broadcasting system information on one or more frequency carriers. The method further comprises receiving, from one or more wireless devices, information on wireless device perception capability; wherein the wireless device perception capability represents the capability of the wireless device to receive the system information broadcasted from the network node. The method also comprises sending at least one report on wireless device perception capability to a network control node. The method additionally comprises enabling or disabling broadcasting of system information on at least one frequency carrier based on instructions received from the network control node.

The disclosed method enables the wireless network to operate in a more energy efficient manner over the prior art by selectively enabling or disabling broadcasting of system information from specific transmission points and/or frequency carriers, which are anyway covered by other transmission points or frequency carriers, based on wireless device measurement feedback.

According to an optional aspect, the broadcasting information comprises an area unique broadcast identity in the system information when broadcasting system information on one or more frequency carriers.

An area unique broadcast identity in the system information broadcast simplifies a correlation to the transmission point and frequency carrier used. The UE is then able to, in the random access, include the broadcast-identity of, at least, the two strongest received transmission points and frequency carriers.

According to an optional aspect, the method further comprises receiving a system information time stamp in a random access message from a wireless device. The method also comprises comparing the system information time stamp with a predetermined system information reading interval and informing the network control node when the system information time stamp indicates that the predetermined system information reading interval is exceeded.

This enables the system to detect if there is a lack of system information broadcast to enable to turn on the corresponding transmission from a transmission point and frequency carrier.

The time stamp can be used to indicate that a UE is not able to receive any system broadcast information where it can make access to the system.

According to an optional aspect, the system information time stamp represents the time when the wireless device most recently received system information.

The time stamp enables determining how old the latest broadcast information reading is. If this is significantly older than the system information reading interval, it is an indication that the UE is not able to receive any system broadcast information where it can make access to the system.

Another aspect relates to a network node configured to broadcast system information in a wireless network. The network node comprises a network communication interface configured for communication with network nodes. The network node also comprises a radio communication interface configured for communication with a wireless device. The network node further comprises processing circuitry configured to cause the network node to broadcast system information on one or more frequency carriers. The processing circuitry is configured to cause the network node to receive, from one or more wireless devices, information on wireless device perception capability; wherein the wireless device perception capability represents the capability of the wireless device to receive the system information broadcasted from the network node. The processing circuitry also configured to cause the network node to send at least one report on wireless device perception capability to a network control node. The processing circuitry additionally configured to cause the network node to enable or disable broadcasting of system information on at least one frequency carrier based on instructions received from the network control node.

The disclosed network node has all the advantages described above in relation to the disclosed method of broadcasting system information in a wireless network.

Another aspect relates to a computer program comprising computer program code which, when executed, causes a network node to execute the above disclose method performed in a network node, with all the advantages described above in relation to the disclosed method of broadcasting system information in a wireless network.

Another aspect relates to a method performed in a network control node of configuring system information broadcasting. The method comprises receiving reports on wireless device perception capability from a plurality of network nodes, wherein each network node is arranged to broadcast system information on one or more frequency carriers. The method further comprises instructing a network node to enable or disable broadcasting of system information on at least one carrier based on the received reports on wireless device perception capability.

The disclosed method enables the wireless network to operate in a more energy efficient manner over the prior art by selectively enabling or disabling broadcasting of system information from specific transmission points and/or frequency carriers, which are anyway covered by other transmission points or frequency carriers, based on wireless device measurement feedback.

According to an optional aspect, the method further comprises determining, based on the received reports, at least one frequency carrier of a network node providing redundant system information; and disabling broadcasting of redundant system on the determined frequency carrier.

By selectively disabling broadcasting of system information from specific frequency carriers, which are anyway covered by other frequency carriers, the wireless network operates in a more energy efficient manner over the prior art.

Another aspect relates to a network control node configured for configuring system information broadcasting. The network control node comprises a network communication interface configured for communication with network nodes. The network control node further comprises processing circuitry configured to cause the network control node to receive reports on wireless device perception capability from a plurality of network nodes, wherein each network node is arranged to broadcast system information on one or more frequency carriers and instruct a network node to enable or disable broadcasting of system information on the determined at least one carrier based on the received reports on wireless device perception capability.

The disclosed network control node configured for configuring system information broadcasting has all the advantages described above in relation to the disclosed method of configuring system information broadcasting.

Another aspect relates to a computer program comprising computer program code which, when executed, causes a network control node to execute the above disclosed method, with all the advantages described above in relation to the disclosed method of configuring system information broadcasting.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
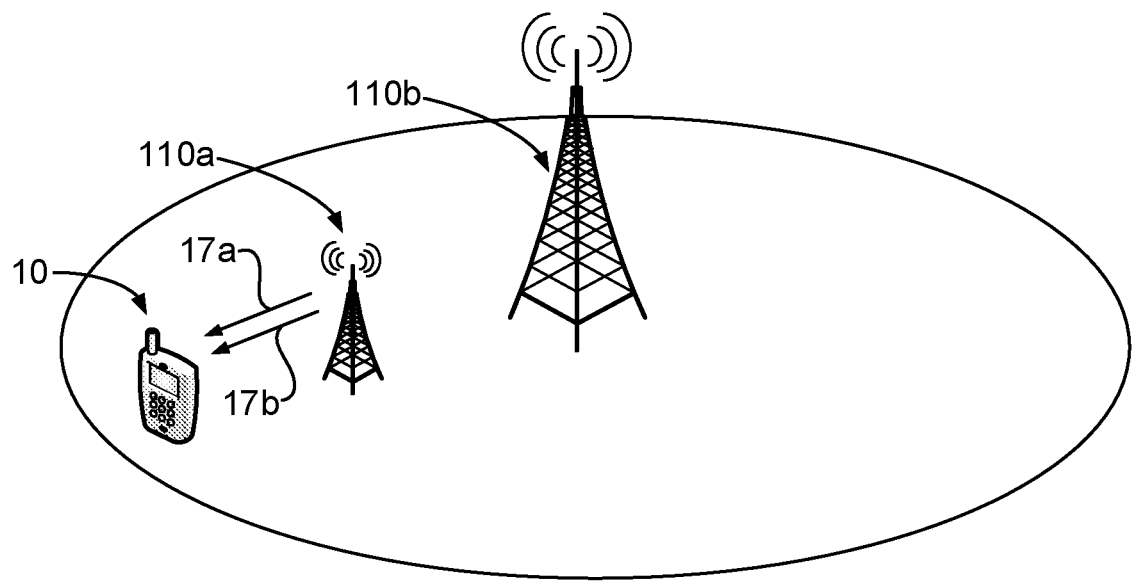
FIG. 1 is an example system configuration of a network in which the disclosed methods and devices are intended to be used.

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

FIG. 1 is an example system configuration of a network In next generation telecommunications systems lean design principles are applied to System Access to mainly improve energy efficiency of the system and decrease overhead system interference. Lean design implies optimizing broadcasting of system information messages to avoid any redundant messaging, i.e., to avoid broadcasting of messages without receiving a corresponding response message.

A UE 10 performs an initial random access procedure in a wireless network in which the disclosed methods and devices are intended to be used. Common system information, e.g. multi-Radio Access Technology, RAT, lists, 17a is communicated after initial system access. Node specific system information, e.g. Thematic Mapper, TM, support and/or Carrier Routing System, CRS, configuration, 17b is communicated after initial node access.

Access Information Table, AIT, is provided for wireless devices, UEs, to do initial random access, which only includes the basic system and random access related parameters, such as RACH configuration and access restrictions while additional system information is received via dedicated signaling.

The current assumption of AIT information would include CSG, Q-RxLevelMin, Frequencybandindicator, Barring info and Prach-configCommon, which are some of the SIB1/SIB2 information elements defined in LTE. Various combinations of the included information are identified by signature sequence indices, SSIs. The AIT also includes header information comprising global time and public land mobile network, PLMN, identity lists.

For UEs in idle mode, without AIT, the initial random access procedure comprises a System Control Plane, SCP, access procedure. The SCP access procedure comprises providing AIT to the UEs. The UEs perform blind detection based on the provided AIT. The UE need to have read the AIT and SSI before it can access.

Figure 2:
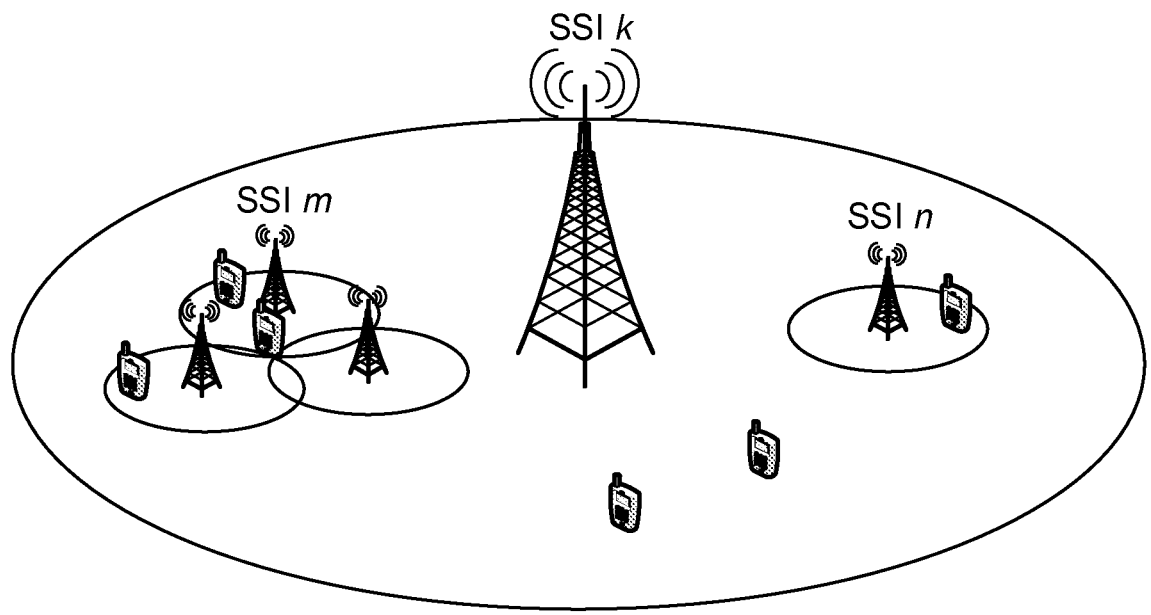
FIG. 2 is an example system configuration of a network in which the disclosed methods and devices are intended to be used.

FIG. 2 is an example system configuration of a network in which the disclosed methods and arrangements are intended to be used. The network is a wireless network that is arranged to broadcast system information on at least two frequency carriers. The wireless network comprises a network node, e.g. an eNodeB, defining a macro cell. The wireless network further comprises a plurality of access nodes, each access node defining a micro cell within the macro cell. A subset of the plurality of nodes have partially overlapping micro cells. Even if the system and UE support the possibility to minimize the broadcast load, a pre-requisite to utilize the concept is that the system can be configured correctly, i.e. to determine which access nodes and frequency carriers that have sufficient coverage from other access nodes and frequency carriers to enable that their system information broadcast can be turned off. A good deployment plan of the system information broadcast plan is very complex to establish without availability of good feedback information, which is currently not specified. There is a need for an improved system information broadcast plan, wherein system information broadcast from one or more access nodes may be discontinued based on feedback.

Figure 3:
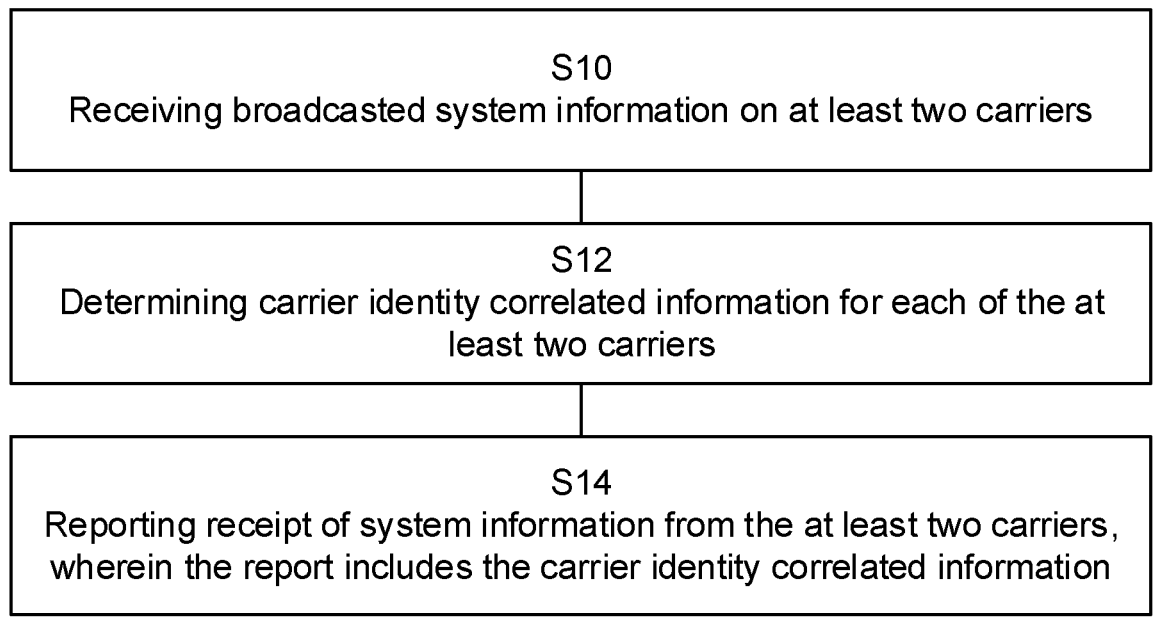
FIG. 3 is a flowchart illustrating embodiments of method steps.

FIG. 3 is a flowchart illustrating embodiments of method steps. FIG. 3 illustrates a method, performed in a wireless device, of assessing system information perception capability in a wireless network that is arranged to broadcast system information on at least two frequency carriers. The method comprises receiving S10 broadcasted system information on the at least two frequency carriers. The method further comprises determining S12, using the received broadcasted system information, frequency carrier identity correlated information for each of the at least two frequency carriers. According to aspects of the disclosure the determining the frequency carrier identity correlated information comprises to identify an area unique broadcast identity included in the system information broadcast from the network node or to determine said information from system broadcast information that the wireless device is capable of reading. The method also comprises reporting S14 receipt of the broadcasted system information on the at least two frequency carriers, wherein the report includes the frequency carrier identity correlated information. According to other aspects of the disclosure, the report includes the area unique broadcast identity that was included in the received broadcasted system information or SSI values for broadcasted system information that is determined to be the strongest. Consequently, the system receives reliable feedback information on receipt of broadcast information broadcasted on a plurality of frequency carriers, e.g. from corresponding transmission points, to be able to enable or disable transmission of system broadcast information from specific transmission points and frequency carriers based on UE measurement feedback. The UE provides measurement feedback which enables the system to know if the UE receives system information broadcast from more than one transmitter, thereby allowing system broadcast to be disabled The inclusion of frequency carrier identity correlated information in the report enables the system to identify and enable UE measurement feedback, so that the system selectively can enable or disable system information broadcast from specific transmission points and frequency carriers.

The UE measurement feedback can be implemented to directly identify transmission points and frequency carriers sufficient to provide the necessary service to the UE.

According to some aspects, the frequency carrier identity correlated information is determined from an area unique broadcast identity included in the received broadcasted system information. The area unique broadcast identity simplifies a correlation to the transmission point and frequency carrier used.

According to some aspects, the frequency carrier identity correlated information is determined based on wireless device measurements.

The UE is then able to, in the random access, include the broadcast-identity of, at least, the two strongest received transmission points and frequency carriers. The system can then, with the broadcast identity, easily identify which transmission points and frequency carriers the UEs hear simultaneously.

According to some aspects, the two frequency carriers are received from geographically separated transmission points.

This allows the network to selectively enable or disable broadcasting of system information from specific transmission points.

According to some aspects, the two frequency carriers are received on different frequencies.

This allows the network to selectively enable or disable broadcasting of system information from specific frequency carriers.

According to some aspects, system information is a System Signature Indication, SSI or an Access Information Table, AIT, comprising the System Signature Indication, SSI.

The UE should, for the system broadcast information it can read, be able to, in the random access, include their SSI value for, at least, the two strongest received broadcasts. It should be noted that there may exist other transmission points and frequency carriers, that are transmitting the same SSI but without transmitting system information, i.e. that have turned off the system information broadcast. Therefore this solution alternative is dependent on that the UE can correlate the system information broadcast transmission with the SSI transmission from the same transmission point, e.g. by timing or channel characteristics.

With the SSI values, the system is then able to correlate this to the transmission point and frequency carriers broadcasting system information in the area where UE makes access.

Building up statistical knowledge from multiple UE reporting can then enable the system to identify from which transmission points and frequency carriers there is multiple (excessive/overlapping) system information broadcast. If so is the case, the system can safely turn off system information broadcast from one transmission point and frequency carrier.

This enables the system to detect if there is a lack of system information broadcast to enable to turn on the corresponding transmission from a transmission point and frequency carrier.

The header information of the AIT comprises global time, which can be used to indicate that a UE is not able to receive any system broadcast information where it can make access to the system. The time stamp of the AIT enables determining how old the latest broadcast information reading is. If this is significantly older than a preferred time reading interval, it is an indication that the UE is not able to receive any system broadcast information where it can make access to the system.

According to an aspect, the system information is a System Information Block, SIB. CSG, Q-RxLevelMin, Frequencybandindicator, Barring info and Prach-configCommon are some of the SIB1/SIB2 information elements defined in LTE. Various combinations of such information enables determining frequency carrier identity correlated information for each of the at least two frequency carriers.

Figure 4:
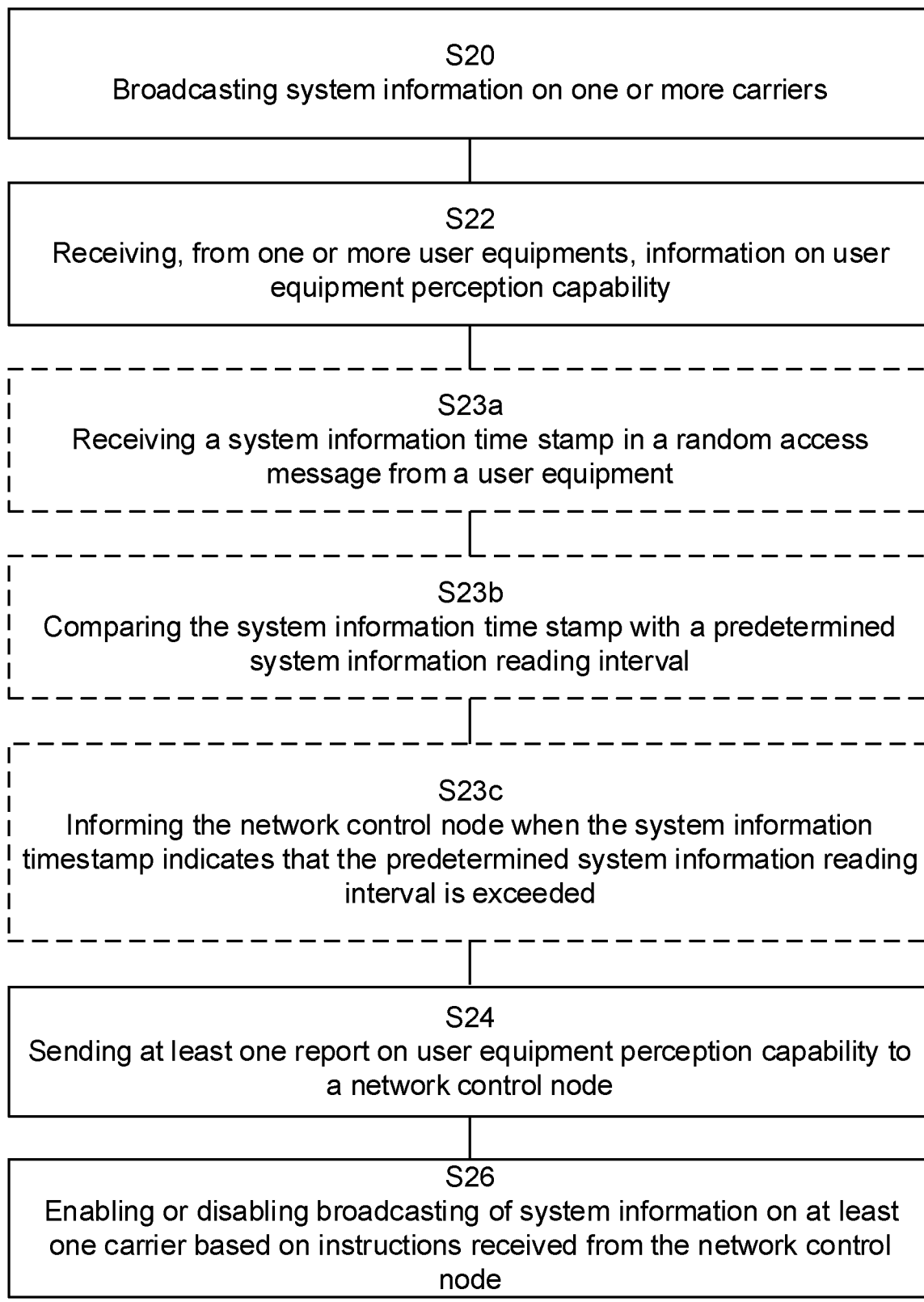
FIG. 4 is a flowchart illustrating embodiments of method steps.

FIG. 4 is a flowchart illustrating embodiments of method steps. FIG. 4 illustrates a method performed in a network node of broadcasting system information in a wireless network. The method comprises broadcasting S20 system information on one or more frequency carriers. The method further comprises receiving S22, from one or more wireless devices, UEs, information on wireless device perception capability; wherein the wireless device perception capability represents the capability of the wireless device to receive the system information broadcasted from the network node. The method also comprises sending S24 at least one report on wireless device perception capability to a network control node. The method additionally comprises enabling S26 or disabling S26 broadcasting of system information on at least one frequency carrier based on instructions received from the network control node.

To optimize system information broadcasting, the system needs to be able to enable or disable transmission of system broadcast information from specific transmission points and frequency carriers based on wireless device, UE, measurement feedback. The broadcasted 20 system information is received by UEs within reach of the network node. To be able to turn off the system broadcast, the UEs need to provide measurement feedback which enables the system to know if the UEs receive system information broadcast from more than one transmitter. The UEs transmit, and the network node receives S22, from the one or more UEs, information on wireless device perception capability. The received S22 information from the UEs can be used to form a picture of transmission points and frequency carriers that overlap, and where transmission may be disabled, or situations where additional transmission is needed to better reach the UEs.

According to some aspects, the broadcasting information comprises an area unique broadcast identity in the system information when broadcasting system information on one or more frequency carriers.

Including an area unique broadcast identity in the system information broadcast simplifies a correlation to the transmission point and frequency carrier used. The UE should then be able to, in the random access, include the broadcast identity of, at least, the two strongest received broadcasts. The system can then, with the broadcast identity, easily identify which transmission points and frequency carriers the UEs hear simultaneously.

In addition to being able to determine when to disable broadcasting, it is desirable to be able to determine when to enabling additional broadcasting.

According to some aspects, the method further comprises receiving S23a a system information time stamp in a random access message from a wireless device. The information time stamp can be used to indicate that a UE is not able to receive any system broadcast information where it can make access to the system. According to some aspects, the system information time stamp represents the time when the wireless device most recently received system information. The information time stamp then enables determining how old the latest broadcast information reading is. If this is significantly older than a preferred time reading interval, it is an indication that the UE is not able to receive any system broadcast information where it can make access to the system.

The method also comprises comparing S23b the system information time stamp with a predetermined system information reading interval. The method additionally comprises informing S23c the network control node when the system information time stamp indicates that the predetermined system information reading interval is exceeded. When the network control node is informed S23c that the UE is not able to receive any system broadcast information where it can make access to the system, this information can be used by the network control node to enable broadcast of system information that is likely to be received by the UE.

Figure 5:
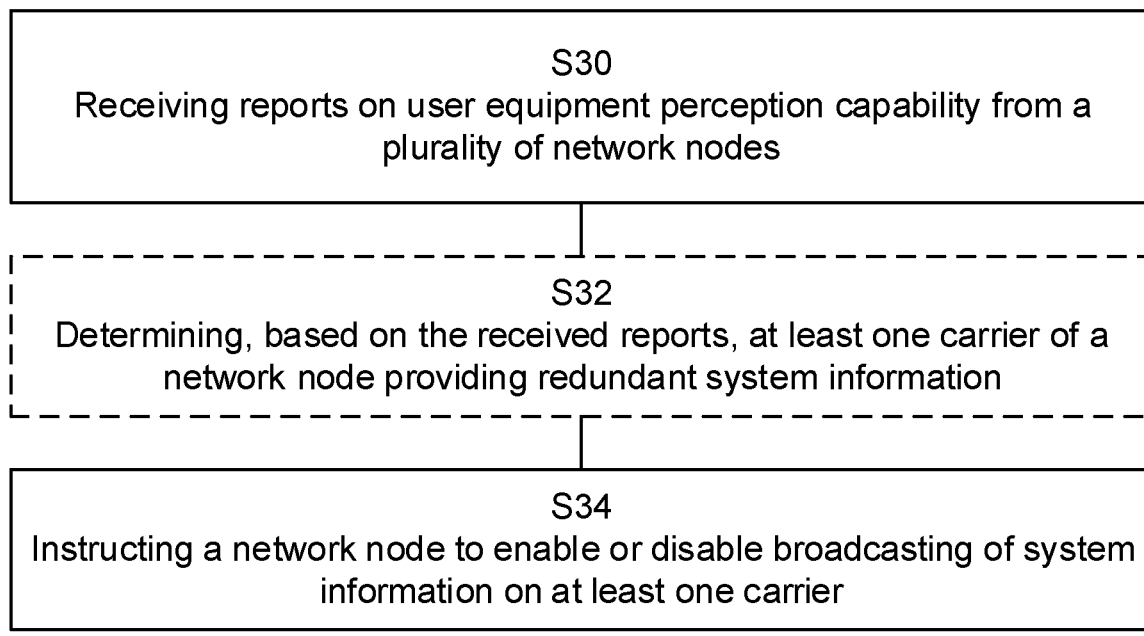
FIG. 5 is a flowchart illustrating embodiments of method steps.

FIG. 5 is a flowchart illustrating embodiments of method steps. FIG. 5 illustrates a method performed in a network control node of configuring system information broadcasting. To optimize system information broadcasting, the system needs to be able to enable or disable transmission of system broadcast information from specific transmission points and frequency carriers based on UE measurement feedback.

The method comprises receiving S30 reports on wireless device perception capability from a plurality of network nodes, wherein each network node is arranged to broadcast system information on one or more frequency carriers.

The received S30 reports on wireless device perception capability enable the network control node to determine if broadcasting on at least one transmission point and frequency carrier is redundant and can be disabled, or determine if a UE is not receiving system broadcast information and enable broadcast of system information on at least one transmission point and frequency carrier such that the UE receives the system broadcast information. The determined need to either enable or disable broadcast of system information can then be used by the network control node to instruct network nodes to take the necessary actions.

The method further comprises instructing S34 a network node to enable or disable broadcasting of system information on at least one carrier based on the received reports on wireless device perception capability.

According to some aspects, the method further comprises determining S32, based on the received reports, at least one frequency carrier of a network node providing redundant system information and disabling broadcasting of redundant system information on the determined frequency carrier.

Example Node Configurations

Figure 6:
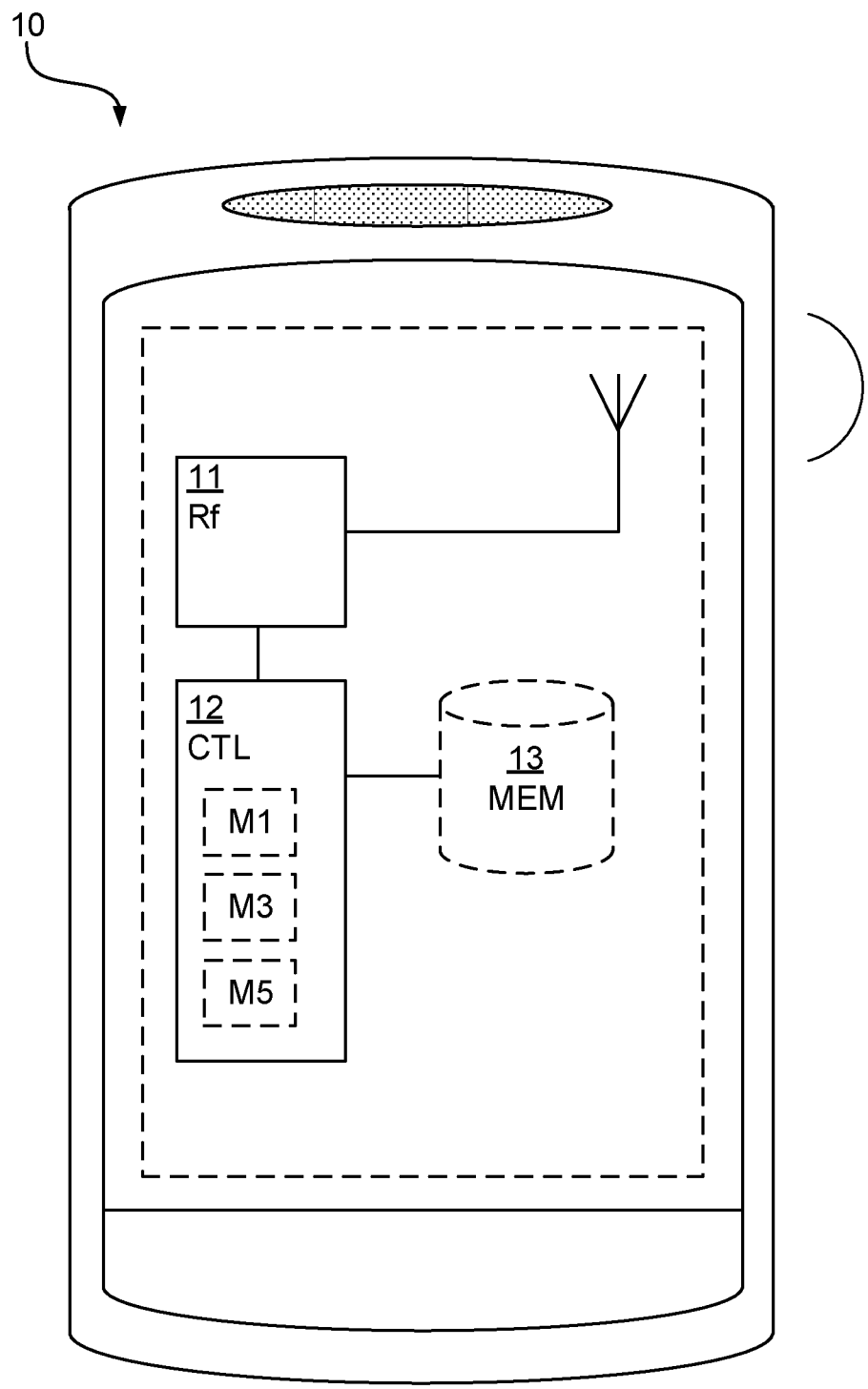
FIG. 6 is an example node configuration of a network node.

FIG. 6 illustrates an example of a wireless device which may incorporate some of the example embodiments discussed above. As shown in FIG. 6, the wireless device, UE, 10 is configured for assessing system information perception capability in a wireless network that is arranged to broadcast system information on at least two frequency carriers. The UE 10 comprises a radio communication interface 11 configured to communicate with a network node. The UE further comprises processing circuitry 12 configured to cause the UE to receive broadcasted system information on the at least two frequency carriers. The processing circuitry 12 is also configured to cause the UE to determine, using the received broadcasted system information, frequency carrier identity correlated information for each of the at least two frequency carriers. The processing circuitry 12 is further configured to cause the UE to report receipt of the broadcasted system information on the at least two frequency carriers, wherein the report includes the frequency carrier identity correlated information.

The UE 10 may further comprise at least one memory unit or circuitry 13 that may be in communication with the processing circuitry 12. The memory 13 may be configured to store received or transmitted data and/or executable program instructions. The memory 13 may also be configured to store any form of beamforming information, reference signals, and/or feedback data or information. The memory 13 may be any suitable type of computer readable memory and may be of volatile and/or non-volatile type. According to some aspects, the memory 13 comprises a computer program comprising computer program code which, when executed, causes the wireless device to execute the above disclosed method steps. According to some aspects the processing circuitry 12 comprises modules configured to perform the methods described above. Hence, according to some aspects, the processing circuitry 12 comprises a receiving module M1 configured to receive broadcasted system information on the at least two frequency carriers. According to some aspects, the processing circuitry 12 comprises a determining module M3 configured to determine, using the received broadcasted system information, frequency carrier identity correlated information for each of the at least two frequency carriers. According to some aspects, the processing circuitry 12 comprises a reporting module M5 configured to report receipt of the broadcasted system information on the at least two frequency carriers, wherein the report includes the frequency carrier identity correlated information.

The processing circuitry 12 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry 12 need not be provided as a single unit but may be provided as any number of units or circuitry.

Figure 7:
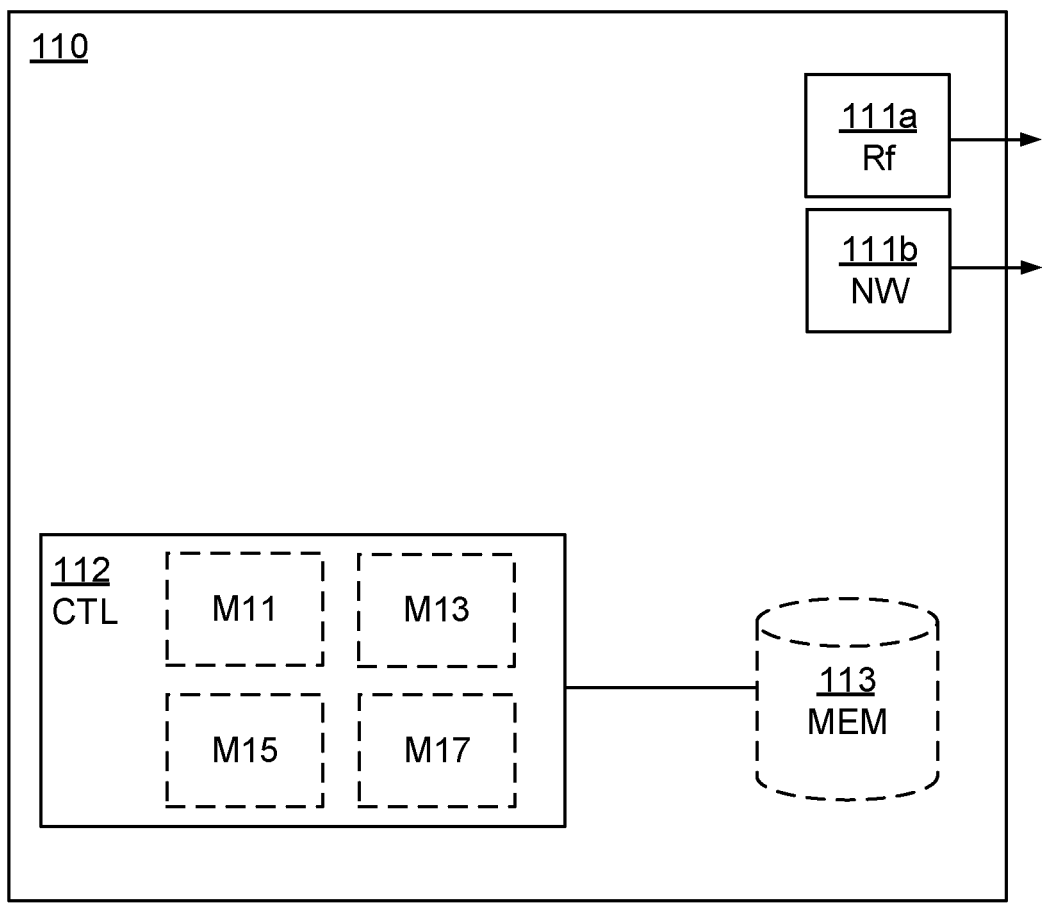
FIG. 7 is an example configuration of wireless device.

FIG. 7 illustrates an example of a network node 110 configured to broadcast system information in a wireless network. The network node 110 comprises a network communication interface 111b configured for communication with network nodes. The network node 110 also comprises a radio communication interface 111a configured for communication with a wireless device, UE. The network node 110 further comprises processing circuitry 112 configured to cause the network node to broadcast system information on one or more frequency carriers. The processing circuitry 112 is further configured to cause the network node to receive, from one or more wireless devices, information on wireless device perception capability. The wireless device perception capability represents the capability of the wireless device to receive the system information broadcasted from the network node. The processing circuitry 112 is also configured to cause the network node to send at least one report on wireless device perception capability to a network control node. The processing circuitry 112 is additionally configured to cause the network node to enable or disable broadcasting of system information on at least one frequency carrier based on instructions received from the network control node.

The network node 110 may further comprise at least one memory unit or circuitry 113 that may be in communication with the radio circuitry 112. The memory 113 may be configured to store received or transmitted data and/or executable program instructions. The memory 113 may also be configured to store any form of beamforming information, reference signals, and/or feedback data or information.

The memory 113 may be any suitable type of computer readable memory and may be of volatile and/or non-volatile type.

According to some aspects, the memory 113 comprises a computer program comprising computer program code which, when executed, causes the network node 110 to execute the above disclosed method steps.

According to some aspects the processing circuitry 112 comprises modules configured to perform the methods described above. Hence, according to some aspects, the processing circuitry 112 comprises a broadcasting module M11 configured to broadcast system information on one or more frequency carriers. According to some aspects, the processing circuitry 112 comprises a receiving module M13 configured to receive, from one or more wireless devices, information on wireless device perception capability; wherein the wireless device perception capability represents the capability of the wireless device to receive the system information broadcasted from the network node. According to some aspects, the processing circuitry 112 comprises a sending module M15 configured to send at least one report on wireless device perception capability to a network control node. According to some aspects, the processing circuitry 112 comprises an enabling-disabling module M17 configured to enable or disable broadcasting of system information on at least one frequency carrier based on instructions received from the network control node.

According to some aspects, the processing circuitry 112 is configured to generate and analyze reference signals, and generate beamformed communications. The processing circuitry 112 may also be configured to provide configuration instructions to the wireless device. The processing circuitry 112 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry.

Figure 8:
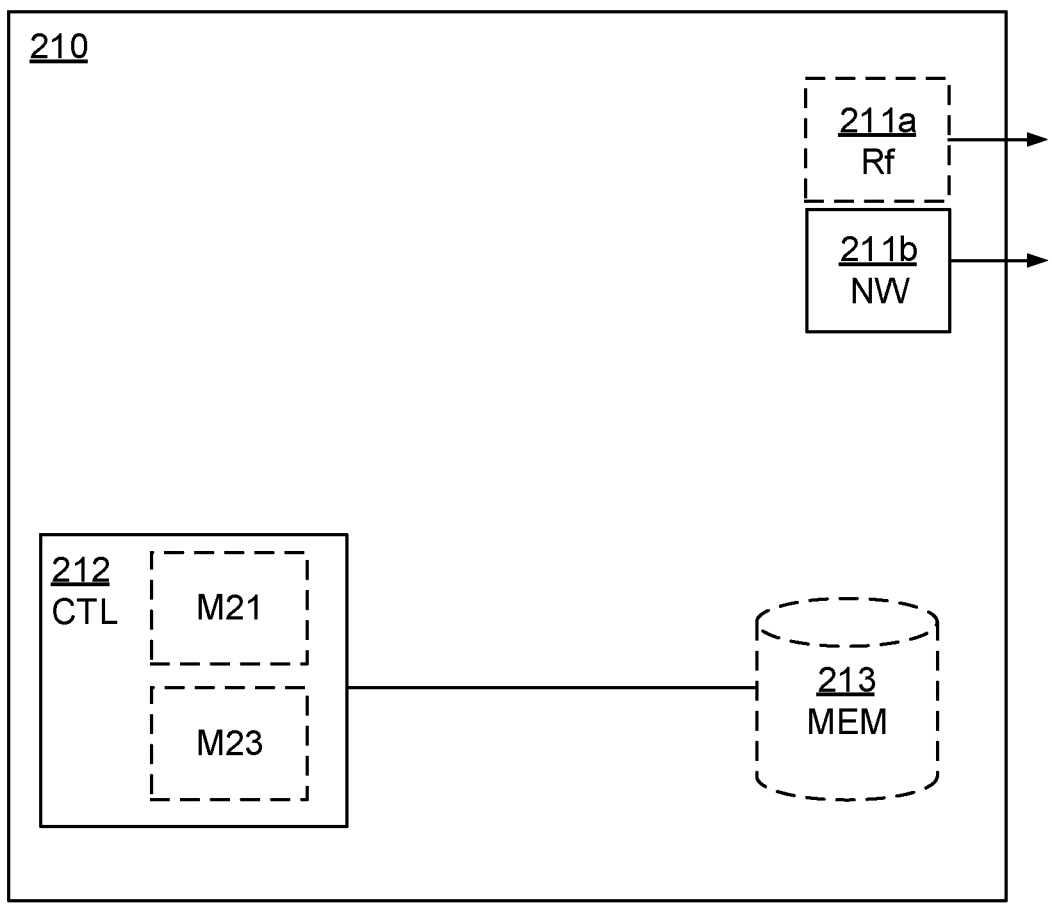
FIG. 8 is an example node configuration of a network control node.

FIG. 8 illustrates an example of a network control node 210 arranged to configure system information broadcasting. The network control node 210 comprises a network communication interface 211b configured for communication with network nodes. The network control node 210 also comprises processing circuitry 212 configured to cause the network control node to receive reports on wireless device perception capability from a plurality of network nodes, wherein each network node is arranged to broadcast system information on one or more frequency carriers, and instruct a network node to enable or disable broadcasting of system information on the determined at least one carrier based on the received reports on wireless device perception capability.

According to some aspects, the processing circuitry 212 is further configured to receive and transmit any form of control signals within a network. The network control node 210 further comprises at least one memory unit or circuitry 213 that may be in communication with the processing circuitry 212. The memory 213 may be configured to store received or transmitted data and/or executable program instructions. The memory 213 may be any suitable type of computer readable memory and may be of volatile and/or non-volatile type. The processing circuitry 212 may be any suitable type of computation unit, e.g. a microprocessor, digital signal processor, DSP, field programmable gate array, FPGA, or application specific integrated circuit, ASIC or any other form of circuitry. It should be appreciated that the processing circuitry need not be provided as a single unit but may be provided as any number of units or circuitry.

According to some aspects, the memory 213 comprises a computer program comprising computer program code which, when executed, causes a network control node to execute the method steps.

According to some aspects the processing circuitry 212 comprises modules configured to perform the methods described above. Hence, according to some aspects, the processing circuitry 212 comprises a receiving module M21 configured to receive reports on wireless device perception capability from a plurality of network nodes, wherein each network node is arranged to broadcast system information on one or more frequency carriers. According to some aspects, the processing circuitry 212 comprises an instructing module M23 configured to instruct a network node to enable or disable broadcasting of system information on at least one carrier based on the received reports on wireless device perception capability.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

Also note that terminology such as eNodeB and wireless device should be considered as non-limiting and does in particular not imply a certain hierarchical relation between the two. In general "eNodeB" could be considered as device 1 and "wireless device" as device 2, and these two devices communicate with each other over some radio channel.

Furthermore, while the example embodiments focus on wireless transmissions in the downlink, it should be appreciated that the example embodiments are equally applicable in the uplink.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system, GPS, receiver; a personal communications system, PCS, wireless device that may combine a cellular radiotelephone with data processing; a personal digital assistant, PDA, that can include a radiotelephone or wireless communication system; a laptop;

a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

Although the description is mainly given for a wireless device, as measuring or recording unit, it should be understood by the skilled in the art that "wireless device" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio, MSR, or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory, ROM, Random Access Memory, RAM, compact discs, CDs, digital versatile discs, DVDs, etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a wireless device, of assessing system information perception capability in a wireless network that is arranged to broadcast system information on at least two frequency carriers, the method comprising:
  receiving broadcasted system information on the at least two frequency carriers; determining, using the received broadcasted system information, frequency carrier identity correlated information for each of the at least two frequency carriers, wherein the frequency carrier identity correlation information is an area-unique identity for the respective carrier or information from which an area-unique identify for the respective carrier can be determined;
  reporting receipt of the broadcasted system information on the at least two frequency carriers, wherein the report includes the frequency carrier identity correlated information; and
  broadcasting a system information time stamp in a random access message to a network node thereby enabling the network node to compare the system information time stamp with a predetermined system information reading interval and to inform a network control node when the system information time stamp indicates that the predetermined system information reading interval is exceeded,
  wherein the system information time stamp represents the time when the wireless device most recently received system information.

2. The method of claim 1, wherein the two frequency carriers are received from geographically separated transmission points.

3. The method of claim 1, wherein the two frequency carriers are received on different frequencies.

4. The method of claim 1, wherein the frequency carrier identity correlated information is determined from an area unique broadcast identity included in the received broadcasted system information.

5. The method of claim 1, wherein the frequency carrier identity correlated information is determined based on wireless device measurements.

6. The method of claim 1, wherein the system information is a System Signature Indication (SSI).

7. The method of claim 1, wherein the system information is an Access Information Table (AIT) comprising a System Signature Indication (SSI).

8. A wireless device configured for assessing system information perception capability in a wireless network that is arranged to broadcast system information on at least two frequency carriers, the wireless device comprising:
  a radio communication interface configured to communicate with a network node and processing circuitry configured to cause the wireless device to
    receive broadcasted system information on the at least two frequency carriers;
    determine, using the received broadcasted system information, frequency carrier identity correlated information for each of the at least two frequency carriers, wherein the frequency carrier identity correlation information is an area-unique identity for the respective carrier or information from which an area-unique identify for the respective carrier can be determined;
    report receipt of the broadcasted system information on the at least two frequency carriers, wherein the report includes the frequency carrier identity correlated information; and
    broadcast a system information time stamp in a random access message to a network node thereby enabling the network node to compare the system information time stamp with a predetermined system information reading interval and to inform a network control node when the system information time stamp indicates that the predetermined system information reading interval is exceeded,
    wherein the system information time stamp represents the time when the wireless device most recently received system information.

9. The wireless device of claim 8, wherein the wireless device is configured to receive the two frequency carriers on different frequencies.

10. The wireless device of claim 8, wherein the system information is a System Signature Indication (SSI).

11. The wireless device of claim 8, wherein the system information is an Access Information Table (AIT) comprising the System Signature Indication (SSI).

12. A method performed in a network node of broadcasting system information in a wireless network, the method comprising:
  broadcasting system information on one or more frequency carriers;
  receiving, from one or more wireless devices, information on wireless device perception capability; wherein the wireless device perception capability represents the capability of the wireless device to receive the system information broadcasted from the network node;
  receiving a system information time stamp in a random access message from a wireless device;
  comparing the system information time stamp with a predetermined system information reading interval;
  informing a network control node when the system information time stamp indicates that the predetermined system information reading interval is exceeded;
  sending at least one report on wireless device perception capability to the network control node; and enabling or disabling broadcasting of system information on at least one frequency carrier based on instructions received from the network control node.

13. The method of claim 12, wherein the broadcasting information comprises an area unique broadcast identity in the system information when broadcasting system information on one or more frequency carriers.

14. The method of claim 12, wherein the system information time stamp represents the time when the wireless device most recently received system information.

15. A network node configured to broadcast system information in a wireless network, the network node comprising:
a network communication interface configured for communication with network nodes,
a radio communication interface configured for communication with a wireless device and processing circuitry configured to cause the network node to
broadcast system information on one or more frequency carriers;
receive, from one or more wireless devices, information on wireless device perception capability; wherein the wireless device perception capability represents the capability of the wireless device to receive the system information broadcasted from the network node;
receive a system information time stamp in a random access message from a wireless device;
compare the system information time stamp with a predetermined system information reading interval;
inform a network control node when the system information time stamp indicates that the predetermined system information reading interval is exceeded;
send at least one report on wireless device perception capability to ft the network control node; and
enable or disable broadcasting of system information on at least one frequency carrier based on instructions received from the network control node.

* * * * *